United States Patent [19]
Keilert et al.

[11] Patent Number: 5,672,304
[45] Date of Patent: Sep. 30, 1997

[54] METHOD FOR MANUFACTURING A FOAMABLE SYNTHETIC MATERIAL FROM SHREDDED FOAM

[75] Inventors: Jürgen Keilert, Kleinwallstadt; Alfred Nogossek, Salzgitter, both of Germany

[73] Assignee: Rieter Automatik GmbH, Germany

[21] Appl. No.: 406,597

[22] Filed: Mar. 20, 1995

[30] Foreign Application Priority Data

Mar. 30, 1994 [DE] Germany .................. 44 11 164.9

[51] Int. Cl.$^6$ ................................. B29C 47/76
[52] U.S. Cl. ................. 264/102; 264/37; 264/DIG. 69; 425/203
[58] Field of Search .............. 264/102, DIG. 69, 264/37, 53; 425/203

[56] References Cited

U.S. PATENT DOCUMENTS

| | | |
|---|---|---|
| 3,026,273 | 3/1962 | Engles . |
| 3,026,274 | 3/1962 | McMillan et al. . |
| 3,151,192 | 9/1964 | Jacobs et al. . |
| 3,344,212 | 9/1967 | Francis ................. 264/37 |
| 3,607,999 | 9/1971 | Corbett et al. ......... 264/37 |
| 3,773,873 | 11/1973 | Spaak et al. .......... 264/37 |
| 3,857,914 | 12/1974 | Aishima et al. ....... 264/102 |
| 4,091,967 | 5/1978 | Kinoshita .......... 264/DIG. 69 |
| 4,531,950 | 7/1985 | Burt .................... 264/37 |
| 4,902,455 | 2/1990 | Wobbe ................. 264/102 |
| 4,994,217 | 2/1991 | Banevicius et al. ... 264/101 |
| 5,217,660 | 6/1993 | Howard ........... 264/DIG. 69 |
| 5,306,132 | 4/1994 | Grundmann et al. ... 264/102 |
| 5,308,562 | 5/1994 | Wohlfahrt-Laymann ... 264/102 |

FOREIGN PATENT DOCUMENTS

| | | |
|---|---|---|
| 584612 | 3/1994 | European Pat. Off. . |
| 2415745 | 10/1975 | Germany ............. 264/DIG. 69 |
| 4016410 | 11/1991 | Germany ................ 264/102 |
| 50-107084 | 8/1975 | Japan ............... 264/DIG. 69 |
| 56-070923 | 6/1981 | Japan . |
| 04325534 | 11/1992 | Japan . |
| 52-69740 | 10/1993 | Japan ..................... 264/37 |
| 1082875 | 9/1967 | United Kingdom . |
| 2076728 | 12/1981 | United Kingdom ..... 264/37 |
| 9420276 | 9/1994 | WIPO .................... 264/37 |

*Primary Examiner*—Allan R. Kuhns
*Attorney, Agent, or Firm*—Banner & Witcoff, Ltd.

[57] ABSTRACT

The invention relates to a method for manufacturing a foaming synthetic material, for example, polystyrol, by means of an extruder, in whose entry the synthetic material is fed, to which by means of a fumigation aperture foaming gas in a liquid form, for example pentane, is introduced at a pressure maintaining the foaming gas in its liquid form, whereby throughout a following extruder region, the synthetic material provided with the foaming gas is homogenecised. For processing the reusable synthetic foam, this foam is supplied in a shredded to the extruder, from which prior to the fumigation aperture by means of a degassing aperture gasses contained in the synthetic foam are extruded, whereby the degassing occurs so far away from the entry of the extruder that the synthetic material has at least reached a doughy state in the region of the degassing aperture, and degassing and fumigation are performed at such a distance from one another that the foaming gas supplied to the fumigation aperture cannot reached the region of the degassing aperture against the current of the synthetic material.

1 Claim, 1 Drawing Sheet

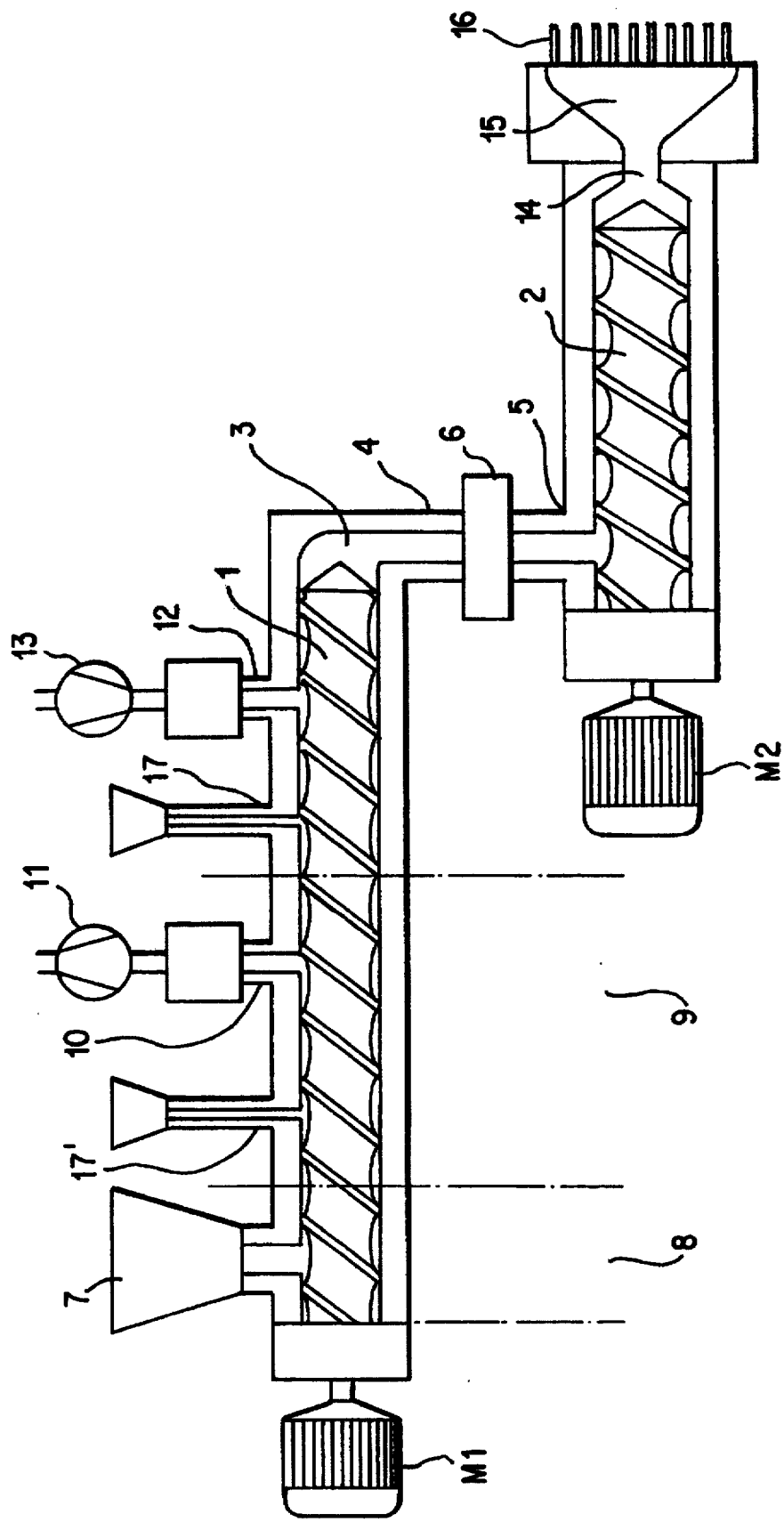

METHOD FOR MANUFACTURING A FOAMABLE SYNTHETIC MATERIAL FROM SHREDDED FOAM

The invention relates to a method and an apparatus for manufacturing a foamable synthetic material, for example from polystyrol, by means of an extruder, in whose entry the synthetic material is fed, to which by means of a fumigation aperture foaming gas in a liquid form, for example pentane, is introduced at a pressure maintaining the foaming gas in its liquid form, whereby throughout a following extruder region the synthetic material provided with the foaming gas is homogenecized. This synthetic material can then directly be processed into foamed material parts.

By means of a cooling of the synthetic material caused in a following extruder region it is achieved that this synthetic material with the foaming gas contained (dissolved) therein is emitted from the following extruder region as a processed material, which then by means of heating can be converted into a synthetic material foam, since, due to the heating, the foaming gas extrudes from the synthetic material.

The extruder can be an assembly unit which essentially serves the extruding process for which essentially the known screw extruder is used. Additionally, it, however, can also serve the kneading process, whereby the screw extruder in usual fashion is equipped with a kneading element.

A method for manufacturing synthetic material foam-products by means of continuous tube extrusion, known from DE-AS 12 61 660, occurs such that pentane by maintening of a high pressure is used in a liquid form as foaming gas which after leaving the extrudent is gassified from the tube extrusion nozzle causing a pressure relief so that the extrudent foams in a zone of low or atmospherical pressure. Hereby, a cooling zone is provided between a supply aperture for the foaming gas and the tube extrusion nozzle in the tube extrusion in order to prevent the foaming in the tube extrusion.

It is also known from DE 26 56 484 C2 to process reusable synthetic foam-waste material by means of extrusion, whereby this waste is supplied in a shredded form to an extruder, in which it is compacted, melted, by means of a degassing aperture degassed and extruded from this under pressure. Further, it is known from DE 21 30 562 B2 to process the shredded waste for the processing of synthetic material waste, e.g. polystyrol, with addition of a liquid or gaseous foaming gas to the foamed material.

The invention is based on the object to define the method and the apparatus such that they are suitable for the processing of reusable synthetic material foam. This is accomplished by supplying the extruder with shredded reusable synthetic material foam, from which gases are derived prior to the fumigation aperture by means of a degassing aperture, whereby the degassing occurs so far away from the entry of the extruder that the synthetic material has at least reached a doughy state in the region of the degassing aperture, and degassing and fumigation are performed at such a distance from one another that the foaming gas supplied to the fumigation aperture cannot reach the region of the degassing aperture against the current of the synthetic material.

Thereby it is achieved that the shredded, reusable synthetic material foam is provided with the possibility of freeing itself of the gas contained therein, for which the relevant synthetic material must at least have reached a doughy state. The gas contained in the reusable synthetic material foam essentially is air which possibly can contain moisture which must be removed prior to the processing of the synthetic material. The fumigation aperture for supplying the foaming gas is arranged in the extruder at such a distance from the degassing aperture so that the fuming gas supplied by means of the fumigation aperture cannot reach the region of the degassing aperture against the current of the synthetic material, it therefore must mix with the more or less melted synthetic material and dissolved therein so that pure synthetic material containing foaming gas is available for further processing.

This further processing can also occur directly. It, however, is also possible to induce a cooling even in the following region of the extruder, so that the following extruder region can be removed for a later foaming of the finished synthetic material, from which then, in the above described fashion, the desired foamed material is produced.

The apparatus for performing the method described before is purposefully arranged such that the degassing aperture is arranged behind the entry of the extruder in transport direction of the extruder, which is then at a distance followed by the fumigation aperture, whereby the distance between the degassing aperture and the fumigation aperture is chosen such that the current of the synthetic material in the extruder keeps the foaming gas away from the degassing aperture. The degassing aperture thereby is arranged closely behind the entry of the extruder, in contrast thereto, the fumigation aperture is arranged closely before the following extruder region in which the synthetic material provided with the foaming gas is homogenized.

A further aperture for supplying additional materials can suitably be provided between the degassing aperture and the fumigation aperture. These additional materials can be used for altering the characteristics of the synthetic material in any desirable fashion.

The extruder region which serves the purpose of homogenizing, and, if the need be, cooling can be adapted as a separate extruder which follows the extruder provided with the fumigation aperture and the degassing aperture. This, in particular, is practical with larger synthetic material throughputs.

BRIEF DESCRIPTION OF THE FIGURE

The FIGURE illustrates an embodiment of the invention.

DETAILED DESCRIPTION OF THE INVENTION

The FIGURE shows the extruder 1 and the following extruder 2, whereby the exit 3 of the extruder 1 is connected with the entry aperture 5 of the extruder 2 by means of a tube section 4. A filter 6 is built into the tube section 4 which, if the need be, confines impurities contained in the processed synthetic material. The extruder 1 is driven by the motor M I and the extruder is driven by the motor M2.

The extruder 1, if filled with reusable synthetic material foam by means of the entry 7 which is then transported in the extruder 1 in direction of its exit 3.

Thereby the synthetic material processed by extruder 1 is melted. The relevant intake and melting zones range along the length 8. The length 9 subsequently connects to this length 8 as a degassing zone, in which gas contained in the synthetic material which is present here in at least a doughy state, is extruded, namely by means of the degassing aperture 10. The vacuum pump 11 is connected to the degassing aperture 10 which serves to degas the relevant synthetic material, as remain-free as possible. The fumigation aperture 12 is arranged in the proximity of the exit 3 of the extruder 1, by which, by means of the high pressure pump 13, foaming gas is pressed into the synthetic material transported in extruder 1, whereby this foaming gas mixes with the synthetic material and is dissolved therein. Thereby the fumigation aperture is distanced as far from the degassing aperture 10 so that the foaming gas supplied by means of the fumigation aperture 12 cannot reach the region of the degassing aperture 10 against the current of the synthetic material. The supplied foaming gas therefore remains to its full extent in the transported synthetic material.

The synthetic material melted in this fashion and provided with foaming gas then reaches the entry aperture 5 of the extruder 2 by means of the tube section 4 and the filter 6, in which the synthetic material is cooled below the exit temperature of the foaming gas. Further, a homogenizing of the transported synthetic material occurs in the extruder 2. This synthetic material is then disbursed at exit 14 and supplied to the strand former 15 from which then a corresponding number of synthetic material strands 16 exit, which consist of the finished, foamable synthetic material.

In the FIGURE, apertures 17 and 17' for supplying any additional materials are provided behind the length 8 and before the fumigation aperture 12, as this is customary with extruding for manufacturing compounded synthetic materials. For this supplying also only one of the two apertures can be provided.

In the following, as an embodiment example a possible embodiment of the apparatus described above is mentioned:

The length of the intake and melting zone 8 with a throughput of 50 kg/h is 8D. (D=screw diameter of the extruder). With larger throughputs the length of the intake and melting zone ranges from 12D to 16D. The length 9 of the degassing zone corresponds to 4D with the before cited minimal throughputs, with larger throughputs 12D is not exceeded for economical reasons. In the region of supply of additional material by means of the aperture 17, the screw lengths necessary are 4D to 12D. For the connecting region in which the foaming gas is supplied under pressure, the screw lengths are 4D through 12D.

The previously described following extruder 2 can also be directly connected with the extruder 1 in form of a continuous extruder, whereby then the above mentioned following extruder region is created (which is realized in the illustrated embodiment by extruder 2), in which the homogenizing of the synthetic material and if necessary also the cooling thereof occurs. If the synthetic material provided with foaming gas is not cooled, then it can directly be processed for the manufacturing of parts of foamed material. If, contrary thereto, the synthetic material is cooled, then, as with the embodiment illustrated in the figure, this synthetic material can be processed to granular material.

We claim:

1. Method for manufacturing a foamable synthetic material comprising supplying reusable synthetic foam material in a shredded form, introducing foaming gas in a liquid form to said synthetic material at a pressure maintaining the foaming gas in its liquid form, degassing said synthetic material prior to the introduction of the foaming gas, the synthetic foam material having at least reached a doughy state for the degassing of the synthetic material, wherein said degassing and said introduction of foaming gas are performed at locations in an extruding assembly separated such a distance from one another that the foaming gas applied to the synthetic material cannot reach the location of degassing against the current of the synthetic material which is maintained in a molten state throughout the extruding assembly, wherein the synthetic material provided with foaming gas is cooled below the foaming temperature of the foaming gas, and the foamable synthetic material is thereafter discharged from the extruding assembly.

* * * * *